United States Patent [19]

Demas et al.

[11] 3,710,722

[45] Jan. 16, 1973

[54] FLUID FLOW VELOCITY ACTUATED SAFETY AND ARMING DEVICE

[75] Inventors: Nicholas L. Demas, Silver Spring, Md.; George J. Fabian, Canoga Park; Alex S. Marderian, Granada Hills, both of Calif.; Sherman L. Min, Upper Marlboro; John M. Wack, Bethesda, both of Md.; Herbert I. Waxman; Edwin W. Wecker, both of Northridge, Calif.

[73] Assignee: The United States of America as represented by the Secretary of the Navy

[22] Filed: March 30, 1971

[21] Appl. No.: 129,435

[52] U.S. Cl. ................................. 102/81.2, 102/86
[51] Int. Cl. ........................................... F42c 5/00
[58] Field of Search ............... 102/81, 81.2, 86, 70

[56] References Cited

UNITED STATES PATENTS

| | | | |
|---|---|---|---|
| 2,779,287 | 1/1957 | Andrews et al. | 102/81.2 |
| 2,644,398 | 7/1953 | Rabinow | 102/86 X |
| 2,985,105 | 5/1961 | Babinow et al. | 102/81.2 |
| 3,286,632 | 11/1966 | Potts, Jr. et al. | 102/81 X |
| 1,793,567 | 2/1931 | Teitscheid | 102/81.2 |
| 2,415,804 | 2/1947 | Allison | 102/86 |

*Primary Examiner*—Samuel W. Engle
*Attorney*—R. S. Sciascia, J. A. Cooke and R. J. Erickson

[57] ABSTRACT

A safety and arming device having rotary electric switches and a detonator rotor contained therein and being adapted to be coupled to a remotely located associated explosive device solely by mild detonating cord. The rotary switches and detonator rotor are mounted for rotational movement on a shaft attached to a bar screw having a nut threaded thereon, the nut being restrained against rotational movement but being movable linearly along the bar screw. Centrifugal weights attached to a rotatable impeller exert a linear force against the nut proportional to fluid flow velocity across the impeller, causing the nut to slide along the bar screw and rotate the switches and detonator rotor to the armed position. A preloaded compression spring acting upon the nut in opposition to the force produced by the centrifugal weights provides velocity discrimination by biasing the nut, rotary switches and arming rotor to the safe position and permitting the rotor and switches to maintain the armed position only in the continued presence of fluid flow above a predetermined magnitude.

7 Claims, 3 Drawing Figures

PATENTED JAN 16 1973

3,710,722

INVENTORS
Nicholas L. Demas
George J. Fabian
Sherman L. Min
Alex S. Marderian
John M. Wack
Herbert I. Waxman
Edwin W. Wecker

BY

ATTORNEYS

FLUID FLOW VELOCITY ACTUATED SAFETY AND ARMING DEVICE

BACKGROUND OF THE INVENTION

This invention relates generally to safety and arming devices, and more particularly to a fluid flow actuated safety and arming device for ordnance.

It has long been recognized that ordnance items such as bombs, missiles, torpedoes, projectiles and the like are often subjected to a certain amount of mishandling, tampering and adverse environmental influences during storage and handling of the ordnance. For this reason, ordnance items have been designed to include safety and arming devices to prevent premature detonation of the ordnance prior to the occurrence of a desired event or condition. Optimally, the safety and arming devices positively preclude premature detonation of the ordnance before its delivery to the target.

The design recognized by experts as the only acceptable safe design provides an inert barrier which interrupts an explosive train leading to the main charge of the ordnance device. Upon the occurrence of the desired arming event, the inert barrier is physically shifted and a detonator is brought into alignment with the remainder of the explosive train to ready the weapon for firing upon actuation of the firing trigger, impact with the target, or other firing event. Many such safety and arming devices additionally include an electric switch maintained in an open circuit position until the occurrence of the arming event, at which time the switch is moved with the detonators to a closed circuit position to ready the weapon for firing.

Although prior art safety and arming devices for ordnance applications have functioned satisfactorily under most conditions of operation, they have not provided adequate safeguards under all operating conditions and, in fact, have contributed to premature firing of ordnance items which have resulted in serious accidents. One of the problems of the prior art safety and arming devices is that the electrical switches and the detonators are physically located in the ordnance item and therefore expose the ordnance item to premature activation by mishandling or environmental conditions. The detonators are usually constructed of sensitive explosive material which may be prematurely ignited by shocks or by extreme heat, such as that which may be produced by an accidental fire which may break out in the weapons magazine. The electrical switches may also be prematurely activated by strong electro-magnetic fields produced by equipment operating in the vicinity of the weapons. Activation of either the detonator or the switches under such circumstances could detonate previously existing ordnance items.

Another problem of existing safety and arming devices is that such devices are designed to arm upon the occurrence of a certain event and, once armed, remain locked in the armed position. Such devices are hazardous when the ordnance item has been armed but not delivered to the target. For example, in ordnance items designed for delivery to a target by aircraft, such as a rocket, once the ordnance item becomes armed by sensing a predetermined air speed of the aircraft, the ordnance remains armed after the plane has returned to its ship or airfield without having delivered the ordnance on the target.

SUMMARY OF THE INVENTION

Accordingly, one object of this invention is to provide a new and improved safety and arming device which affords greater safety in ordnance applications.

Another object of the instant invention is to provide an improved safety and arming device which is separable from an associated explosive device and which controls the arming of the associated explosive device from a location external thereof.

Still another object of the invention is the provision of a fluid flow velocity actuated safety and arming device.

A further object of the present invention is to provide an ordnance safety and arming device which arms the associated ordnance only in the continued presence of an operating environmental condition.

A still further object of the instant invention is to provide a safety and arming device which will arm a rocket in the presence of a fluid flow velocity above a predetermined magnitude and will disarm the rocket when the fluid flow velocity decreases below that predetermined magnitude.

Another still further object of the instant invention is to provide an ordnance safety and arming device which arms and will remain armed only in the presence of a fluid flow velocity above a predetermined magnitude and cannot be armed by shocks or other transitory effects.

Briefly, in accordance with one embodiment of this invention, these and other objects are attained by providing a safety and arming device for an associated ordnance item and is operable to arm such item from a position external of the ordnance item. Electroresponsive detonators and electrical switches are contained within the safety and arming device and are movable from an unarmed position to an armed position when an impeller senses fluid flow velocity above a predetermined magnitude and the switches and detonators are returned to their unarmed positions when the sensed fluid flow velocity decreases below that predetermined magnitude. The externally positioned safety and arming device is adapted to be coupled to an ordnance item solely by an explosive coupling such as mild detonating cords.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figure 1:
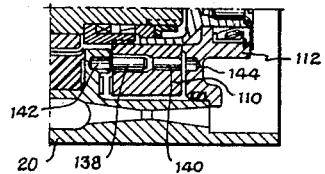
FIG. 1 is an end view of the rear of a safety and arming device constructed according to a preferred embodiment of the present invention.

Referring now to the drawings wherein like reference characters designate identical or corresponding parts throughout the several views, and more particularly to FIG. 1 thereof, wherein the rear or downstream end of the safety and arming device of the present invention is shown as having a plurality of peripherally disposed outwardly projecting mounting lugs 11 by which the device may be mounted upon an aircraft in a position external of an associated ordnance item and within the airstream passing an aircraft, or within a fluid medium surrounding any other moving launching vehicle.

Figure 2:
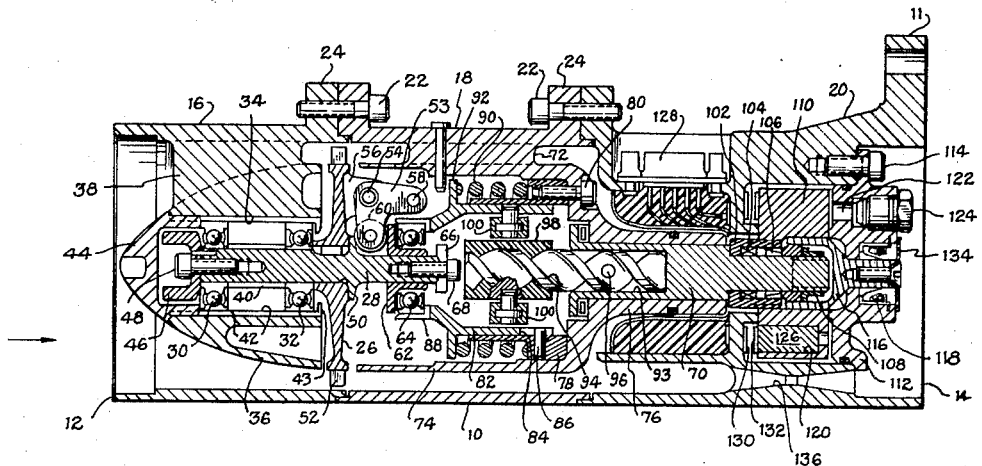
FIG. 2 is a longitudinal cross-sectional view of the safety and arming device of this invention, taken along lines 2—2 of FIG. 1.

Referring now to FIG. 2, wherein the safety and arming device is shown as having an elongate housing 10, which when supported by lugs 11 within the airstream passing an aircraft, is adapted to injest air at its upstream end 12 and to exhaust the injested air at its downstream end 14. The housing 10 is formed by assembling together a turbine impeller housing 16, a transmission housing 18 and a rotor housing 20, which housings may be fastened together in coaxial alignment by any suitable means such as a plurality of bolts 22 received in threaded apertures formed in a plurality of lugs 24 formed around the periphery of the housing sections.

At the forward end of the safety and arming device, a turbine wheel impeller 26 is rotatably mounted upon an impeller shaft 28 which is coaxially supported within impeller housing 16 by a pair of bearing assemblies 30 and 32, each being received within a cylindrical bore 34 formed coaxially within a streamlined deflector 36, which, in turn, is coaxially supported within the impeller housing 16 by a plurality of radial struts 38 which may be, for example, equiangularly spaced around the deflector in a cruciform configuration. The bearings are maintained in longitudinally spaced positions along shaft 28 by means of a cylindrical bearing spacer 40. A cylindrical insert 42 is press-fit into the cylindrical bore 34 and has an inwardly projecting annular flange or rib 43 to restrain the bearings against downstream movement within the cylindrical bore 34. The bearings are also constrained at the upstream end by a bearing nut 44 which is threadedly received within the upstream end of the cylindrical bore 34 and is configured such as to complete the streamlined configuration of the deflector 36. To eliminate vibrations caused by impeller unbalance and thereby to prolong the life of the parts, the impeller assembly is dynamically balanced by mounting a balance wheel 46 on the upstream end of the impeller shaft 28 within bearing nut 44 by a bolt 48 threadedly received in an axial bore formed in the impeller shaft 28. The impeller shaft has an annular shoulder 50 against which the impeller 26 is held when the bearing nut 44 is threadedly received within the cylindrical bore 34 to thus secure all parts of the impeller assembly in the positions shown in FIG. 2. A plurality of vanes 52 are positioned circumferentially around the periphery of the impeller and extend beyond the profile of the deflector 36 into the airstream flowing through housing 10 to impart a rotational movement to the impeller which is proportional to the speed of the airstream through the housing.

To sense the fluid flow velocity of the airstream through the housing and actuate an arming mechanism, a plurality of centrifugal weights 53, such as bell cranks, are mounted upon the impeller at equiangular spaced locations for rotation therewith. Each bell crank is pivotally attached to the impeller by a hinge pin 54, which is rotatably received within an aperture formed in the apex of the bell crank and is also received in aligned apertures formed in a pair of projecting support tabs 56 formed on the impeller 26. Each bell crank may be provided with an additional weight 58 attached to the radially outermost arm of the bell crank for the purpose of contributing to the counterclockwise rotation of the bell crank about the pin 54, as viewed in FIG. 2, under the influence of centrifugal force when subjected to rotational movement by the impeller. The other arm of each bell crank is provided with a bifurcated portion at the extremity thereof to rotatably receive a roller bearing 60. During rotation of the impeller, the bell cranks pivot about their respective pins 54 under the influence of centrifugal force and each of the roller bearings 60 is forced rearwardly along impeller shaft 28 to bear against the inner race 62 of bearing assembly 64 which is slideably received upon the impeller shaft 28. Also, mounted upon shaft 28 at the downstream end thereof is a stop ring 66, which is adjustably mounted upon the shaft 28 by a bolt 68, to adjust the distance through which the bearing assembly is permitted to slide along shaft 28.

Since the rotational speed of the impeller 26 is proportional to the velocity of the air flow through the housing, the magnitude of the centrifugal force acting upon the bell cranks 53 and consequently the magnitude of the force acting upon bearing 64 are also proportional to the velocity of the air flow.

To translate the linear sliding movement of the ball bearing assembly 64 to rotational movement of a rotatable arming shaft 70, a transmission is included within housing 18, which consists essentially of a plurality of radial struts 72 to support a cup-shaped slider casing 74 coaxially therein. Slider casing 74 has a reduced diameter cylindrical extension 76 extending rearwardly of the base of the cup-shaped slider casing which provides a support for the rotatable arming shaft 70. A cylindrical slider guide 78 is mounted coaxially within the cup-shaped slider casing 74 by a plurality of circumferentially disposed bolts 80 extending through the base of the cup-shaped slider casing. Slideably received within the cylindrical slider guide 78 is a cylindrical slider 82 having a longitudinal slot, or keyway, 84 formed in the downstream end thereof to receive a key 86 which is rigidly secured within an aperture formed in the slider guide 78 and extends into keyway 84 to permit the slider to move linearly but prevent rotational movement of the slider. The slider 82 has a reduced diameter portion in abutting contact with the outer race 88 of the ball bearing assembly 64 so that sliding movement of the bearing 64 along shaft 28 will impart longitudinal sliding movement to the slider 82. A preloaded cylindrical coil compression spring 90 is received within the annular space between the slider guide 78 and the cup-shaped slider casing 74 and is seated at one end against the base of the slider guide 78 and at its other end against an outwardly extending radial flange 92 formed on the slider to resiliently urge the slider into abutting contact with the outer race 88 of the ball bearing assembly 64. The preloaded compression spring provides a velocity discrimination capability for the safety and arming device as will be more fully described hereinbelow.

The arming shaft 70 is provided with an axial bore 93 formed in the upstream end thereof to receive a bar screw 94 which is connected thereto by a pin 96 extending through aligned apertures formed in the bar screw and in the arming shaft to prevent relative rotation therebetween. A bar screw nut 98 is threadedly mounted upon the bar screw 94 and is also coupled to the slider 82 by a gimbal ring assembly 100 which prevents rotational movement of the nut 98. Thus, movement of the centrifugal weights 53 against the ball bearing assembly 64, induced by the spinning of the impeller 26, produces rearward sliding movement of the ball bearing assembly 64, the slider 82, the gimbal ring assembly 100 and longitudinal movement of the bar screw nut 98 along bar screw 94. Since the nut 98 is prevented from rotating, longitudinal movement of the nut along the bar screw produces rotational movement of the bar screw 94 and the arming shaft 70 connected thereto.

Within the detonator rotor housing 20, a spline 102 is rigidly secured to the rearward end of arming shaft 70 by any suitable means, such as pairs of expandable cone bushings 104 and 106 positioned radially between the arming shaft and the interior of the spline and adapted to be expanded by force exerted thereagainst by a bushing nut 108 threadedly engaged upon the rearward end of the arming shaft. An internally splined arming rotor 110 is mounted upon the spline 102 with the splined surfaces of the spline 102 and arming rotor intermeshed to securely support the arming rotor upon the arming shaft 70 and thereby prevent relative rotation between the arming rotor 110 and the spline 102. A circular mild detonating cord connection block 112 is mounted upon the rearward end of the detonator rotor housing 20 by means of a plurality of peripherally spaced bolts 114. A bell-shaped rotor guide 116 is slideably received over the bushing nut 108 and further supports the arming rotor 110. Rotor guide 116 has a reduced diameter portion extending through a central aperture formed in the connection block 112 and is rotatably supported therein by a bearing assembly 118. The arming rotor 110 has four detonator receiving chambers 120 defined by longitudinal through apertures formed therein each being angularly spaced 90° from the adjacent detonator chamber, as more clearly shown in phantom in FIG. 1. The connection block 112 similarly has four equiangularly spaced mild detonating cord receiving chambers 122 formed therein and having the same radial distance from the axis of the arming shaft as the detonator receiving chambers 120. While in storage, the mild detonating cord receiving chambers 122 are hermetically sealed by a plurality of bolts 124 which may be conveniently removed when the safety and arming device is to be used to facilitate the threaded connection thereto of mild detonating cords which provide an explosive coupling to an ordnance device intended to be armed by the safety and arming device.

Prior to the occurrence of an arming event, the rotor is in the position shown in FIGS. 1 and 2 with the detonator chambers angularly displaced 45° from the mild detonating cord receiving chambers 122 such that the explosive train is interrupted by a barrier of inert material. To move from the illustrated safe position to the armed position, in which the detonator receiving chambers 120 are in alignment with the mild detonating cord receiving chambers 122, the arming rotor 110 must be angularly rotated through an angle of 45° by the arming shaft, which angle is controlled by the pitch of the bar screw 94 and the extent of movement of the slider, as determined by the position of slider stop ring 66.

In addition to interrupting the explosive train while the device is in the safe position, arming rotor 110 also interrupts the electrical firing circuit to each electroresponsive detonator 126 received within the detonator chambers 120. The electrical firing circuit includes a miniature multipin connector 128 mounted upon the housing and adapted to be coupled to an external cable leading to a firing control switch located, for example, in the cockpit of the launching aircraft. Electrical conductors extend from the multipin connector 128 through a potting compound and are connected to electrical contacts on a flat switch ring 130 formed of insulating material which is fixedly secured to the housing in closely spaced relationship to a second flat switch ring 132 mounted upon the arming rotor 110 for rotation therewith and having electrical connections to each of the electroresponsive detonators 126. The switch rings 130 and 132 have electrical contacts so positioned thereon that, when the arming rotor 110 is in the safe position, the contacts are not in engagement with one another and the firing circuit is interrupted but, when the arming rotor has been moved to its armed position, these electrical contacts are brought into engagement to complete the firing circuit to each of the electroresponsive detonators 126 and thereby ready the device for firing in response to a command signal. To provide a visual indication of whether the safety and arming device is in its safe condition or in its armed condition, an indicator plate 134 is attached externally to the end of the reduced diameter necked portion of the rotor guide 116 and has a cutout viewing window formed therein for registry with suitable indicia printed on the exterior of the mild detonating cord connection block.

Since the rotational speed of the impeller 26 is proportional to the velocity of the fluid flow through housing 10, a plurality of converging-diverging choke nozzles 136 are formed in the detonator housing 14 to limit the velocity of the flow therethrough to subsonic speeds, thereby limiting the maximum rotational velocity of the turbine impeller and preventing excessive rotational velocities and possible over-stressing of parts which might otherwise occur when the safety and arming device is subjected to supersonic flow streams.

Figure 3:
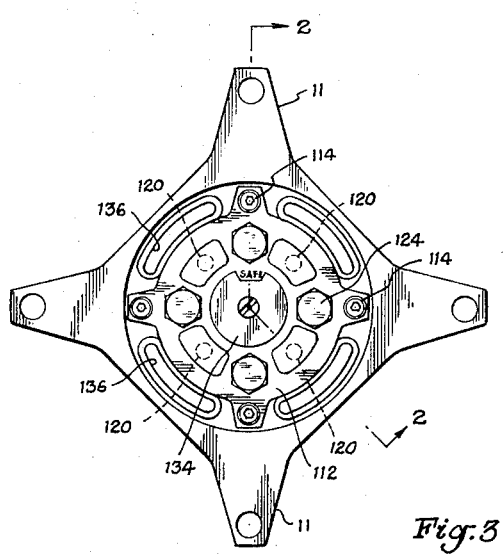
FIG. 3 is a partial cross-sectional view of the detonator rotor and rotary switch assembly of this invention.

During handling of the safety and arming device, the device is frequently subjected to impacts or shocks which, if acting along the longitudinal axis of the device, tend to produce linear set-back movement of the slider which would cause rotation of the arming rotor. To prevent the device from unintentionally arming as the result of such shock loads, the pair of inertial pistons 138 and 140 are disposed within an aperture formed in the arming rotor 110 as shown in FIG. 3. The inertial pistons are positioned with their piston heads adjacent one another. Coil compression springs surround the piston rods to resiliently bias the piston heads into abutting contact with one another. Piston rod receiving recesses 142 and 144 are formed in the detonator housing 20 and in the mild detonating cord connection block 112, respectively, in alignment with pistons 138 and 140 when the arming rotor is in the safe position. Thus, any impact or shock acting along the axis of the safety and arming device causes one of the pistons 138 or 140, depending upon the direction of the shock, to seat within its respective recess 142 or 144, due to the setback force of the piston, thereby locking the rotor against rotational movement which would otherwise be caused by shock induced setback forces acting upon the slider.

The operation of the safety and arming device of this invention will be described in reference to its use with aircraft launched rockets, although it is to be understood that the present invention may be used on other types of ordnance devices delivered by various launching vehicles operating in fluid media other than air. Prior to installation of the rockets upon the launching aircraft, the safety and arming device may be stored separately from the rockets. Since the electrical switches and the sensitive electroresponsive detonators are contained within the safety and arming device itself, the rockets are free of any sensitive explosives and electrical switches and therefore safe against accidental ignition might otherwise be caused by heat, electromagnetic radiation, or other environmental hazards. When required for use, the safety and arming device is mounted on the launching aircraft by mounting lugs 11 in a position exposed to the airstream passing the aircraft and is explosively coupled to the rockets by removing bolts 124 and threadedly connecting mild detonating cords to the chambers 122. Even when explosively coupled to the rockets by the mild detonating cords, the weapon system is safe against accidental ignition because, while the arming rotor is in the safe position, the electrical switches 130 and 132 interrupt the firing circuit to the detonators 126 and the detonator chambers 120 are not aligned with the mild detonating cords, thus interrupting the explosive train to the ordnance device with an inert barrier. The strength of the coil compression spring 90, which resiliently opposes movement of the slider 82 is designed to prevent movement of the slider until an air speed of any predetermined magnitude considered to be safe is sensed. For example, spring 90 may be of such strength as to prevent movement of the slider until the impeller is rotated by an airstream of at least 250 knots whereby the safety and arming device is maintained in the unarmed condition until the launching aircraft is airborne and has reached a sufficiently safe operating speed. Since the rotational speed of the impeller 26 is proportional to the velocity of the airstream injested in housing 10, movement of the centrifugal weight bell cranks 53 will be opposed and prevented by the spring 90 until the impeller is rotating in air velocities above 250 knots, at which point the centrifugal force developed by the bell cranks overcomes the resilient force of spring 90 causing the bell cranks to pivot about their hinge pins 54 and the roller bearings 60 to force the ball bearing assembly 64 and the slider 82 rearwardly along shaft 28. Bar screw nut 98, which is connected to the slider by the gimbal assembly 100, moves rearwardly along the bar screw as the slider is moved rearwardly by the bell cranks, thus imparting rotational movement to the bar screw and the arming shaft connected thereto, thereby rotating arming rotor 110 through an angle of 45° and bringing detonators 126 into alignment with the mild detonating cords to complete the explosive train to the rocket while additionally making electrical contact between the switch rings 130 and 132 to complete the firing circuit to the detonators. The safety and arming device will remain in the armed position as long as the aircraft is flying at speeds in excess of 250 knots. Should the aircraft return to its airfield or aircraft carrier without expending all of the rockets, as the aircraft decelerates to its landing speed and the air flow through the housing decreases below 250 knots, the restoring force of the preloaded compression spring 90 overcomes the centrifugal forces produced by the bell cranks whereupon the spring forces the slider 82, bearing assembly 64 and bell crank rollers 60 forward to their initial position, which movement is translated through the bar screw nut 98 and bar screw 94 to the arming rotor 110 to rotate the latter back to its unarmed position.

For the foregoing, it will be understood that the present invention provides a safety and arming device which affords much greater safety to an ordnance system than any prior safety and arming devices. The safety and arming device of the present invention is an independent unit from the rocket or other ordnance device which it is to control and, since the detonators and electrical switch assembly are contained within the safety and arming device, the rockets or other ordnance items are free of any sensitive explosives and electrical switches which may accidentally ignite or detonate the ordnance item. Moreover, the spring-biased impeller-driven centrifugal weight assembly senses the air flow velocity through the housing and provides an air speed discriminating capability which maintains the safety and arming device in its unarmed condition until a predetermined minimum safe flying speed, such as 250 knots, is sensed by the rotating impeller. The safety and arming device of this invention maintains the rotor in the armed position at all air speeds above the predetermined minimum air speed and returns the rotor to its unarmed position when the air speed decreases below the predetermined minimum air speed. Thus, the safety and arming device of this invention maintains an ordnance system in an unarmed position during takeoff, landing, and at all times during storage. The safety and arming device of this invention also includes an inertial weight mechanism within the arming rotor to lock the arming rotor against accidental arming which might otherwise be caused due to shocks and other transistory effects upon the device.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A safety and arming device for an explosive device positioned externally thereof, comprising:
    a housing adapted to be in a slipstream to receive fluid flow therethrough;

fluid flow velocity operated means mounted in said housing responsive to a fluid velocity above a predetermined magnitude and comprising, a slider mounted for reciprocal movement between a first position and a second position, resilient biasing means engaging said slider to yieldingly retain said slider in said first position below a fluid velocity of said predetermined magnitude and for returning said slider to said first position from said second position upon a decrease of fluid flow below said predetermined magnitude, a turbine impeller mounted for rotational movement about the longitudinal axis of said housing in response to fluid flow thereacross, centrifugally actuated bell cranks each pivotally mounted at its apex on said impeller at equiangular spaced positions for rotation therewith and having one of its arms engaging said slider for imparting a linear force against the slider proportional to the speed of said impeller arming means mounted in said housing adapted to be coupled to an explosive device and being movable from an unarmed position, wherein an explosive train is interrupted, to an armed position, wherein the explosive train is complete and comprising, at least one electro-responsive detonator adapted to be electrically connected to a firing circuit, switch means electrically connected to each of said detonator and mechanically operated by said arming means for movement from an open circuit position to a closed circuit position; and transmission means connected to said slider and to said arming means for causing said arming means to be moved from said unarmed position to said armed position when said slider is moved from said first position to said second position and for returning said arming means to said unarmed position when said slider is moved from said second position to said first position.

2. The device of claim 1 wherein each of said bell cranks further includes:

a roller bearing pivotally mounted upon the extremity of said slider engaging arm for rolling contact with said slider.

3. The safety and arming device of claim 1 further comprising means for preventing rotation of said slider, said transmission means including an arming shaft supporting said arming means and said switch means for rotation, and motion translating means coupled to said arming shaft and to said slider for translating linear movement of said slider into rotational movement of said arming shaft.

4. The safety and arming device of claim 3 wherein said motion translating means comprises:

a bar screw secured to said arming shaft in axial alignment therewith, and a bar screw nut threadedly engaging said bar screw and being connected to said slider for linear movement therewith.

5. The safety and arming device of claim 4 wherein said bar screw nut is connected to said slider by a gimbal assembly.

6. The safety and arming device of claim 5 further comprising:

fluid flow velocity limiting means positioned within said housing for limiting fluid flow through said housing to subsonic velocities.

7. The safety and arming device of claim 6 wherein said fluid flow velocity limiting means includes means for directing the fluid flow in said housing through a plurality of converging-diverging nozzles.

* * * * *